(12) United States Patent
Huff et al.

(10) Patent No.: US 9,994,117 B2
(45) Date of Patent: Jun. 12, 2018

(54) SYSTEM AND METHOD FOR PROVIDING POWER TO A MINING OPERATION

(71) Applicant: Artisan Vehicle Systems Inc., Camarillo, CA (US)

(72) Inventors: Brian R. Huff, Newbury Park, CA (US); Michael E. Kasaba, Malibu, CA (US)

(73) Assignee: Artisan Vehicle Systems Inc., Camarillo, CA (US)

( * ) Notice: Subject to any disclaimer, the term of this patent is extended or adjusted under 35 U.S.C. 154(b) by 0 days. days.

(21) Appl. No.: 15/133,478

(22) Filed: Apr. 20, 2016

(65) Prior Publication Data

US 2017/0305290 A1    Oct. 26, 2017

(51) Int. Cl.
*B60L 11/18* (2006.01)
*B60K 25/10* (2006.01)
*B60L 7/10* (2006.01)

(52) U.S. Cl.
CPC .......... *B60L 11/1842* (2013.01); *B60K 25/10* (2013.01); *B60L 7/10* (2013.01); *B60K 2025/103* (2013.01); *B60L 2200/36* (2013.01); *B60L 2230/30* (2013.01)

(58) Field of Classification Search
CPC ........ B60L 11/1842; B60L 7/10; B60L 25/10; B60L 2230/30; B60L 2200/36; B60L 2025/103; B60K 2025/103
See application file for complete search history.

(56) References Cited

U.S. PATENT DOCUMENTS 4,471,231 A * 9/1984 Minami ................... B60M 1/18
                                                    191/3
4,700,023 A * 10/1987 Hillmann ................. B60M 7/00
                                                    191/12 R
5,163,537 A * 11/1992 Radev ...................... B60K 1/04
                                                    180/65.1

(Continued)

FOREIGN PATENT DOCUMENTS

AU    2009321556 B2    6/2010
CA       2743947 A1    6/2010

(Continued)

OTHER PUBLICATIONS

International Search Report and Written Opinion dated Jul. 11, 2017 for International Application No. PCT/US2017/025331.

*Primary Examiner* — Jacob B Meyer
(74) *Attorney, Agent, or Firm* — Plumsea Law Group, LLC

(57) ABSTRACT

A system for employing gravity to provide electrical power for mining operations in a mine includes a battery configured to power an electric vehicle. The vehicle includes a kinetic energy capture system that can charge the battery as the vehicle conveys a loaded vehicle down a ramp from an ore face to a chamber. Traveling down the ramp produces a surplus charge in the battery due to a weight differential between a loaded vehicle traveling down a ramp producing more energy via the kinetic energy capture system than energy used by the vehicle to convey the empty vehicle up the ramp to the ore face. A discharging device disposed in the chamber is configured to discharge the surplus energy out of the battery and into the mine's power grid. One or multiple trips between the ore face and the chamber may fully charge the battery.

25 Claims, 9 Drawing Sheets

(56) References Cited

U.S. PATENT DOCUMENTS

| | | | |
|---|---|---|---|
| 5,180,544 A | 1/1993 | Yoshioka et al. | |
| 5,221,880 A * | 6/1993 | Bartholow | B60L 9/04 |
| | | | 318/139 |
| 5,291,960 A | 3/1994 | Brandenburg et al. | |
| 5,293,947 A * | 3/1994 | Stratton | B60K 6/46 |
| | | | 180/2.1 |
| 6,230,496 B1 * | 5/2001 | Hofmann | B60K 6/105 |
| | | | 180/65.27 |
| 6,390,215 B1 | 5/2002 | Kodama et al. | |
| 7,190,133 B2 | 3/2007 | King et al. | |
| 7,304,445 B2 | 12/2007 | Donnelly | |
| 7,416,039 B1 | 8/2008 | Anderson et al. | |
| 7,507,500 B2 | 3/2009 | Donnelly et al. | |
| 7,520,355 B2 | 4/2009 | Chaney | |
| 7,812,555 B2 * | 10/2010 | Adra | B60L 11/04 |
| | | | 180/65.21 |
| 7,848,857 B2 | 12/2010 | Nasr et al. | |
| 8,047,317 B2 | 11/2011 | Mari Curbelo et al. | |
| 8,292,052 B2 | 10/2012 | Bohori et al. | |
| 8,505,464 B2 * | 8/2013 | Huber | B60L 5/04 |
| | | | 104/287 |
| 8,511,449 B2 | 8/2013 | Kumar | |
| 8,550,007 B2 * | 10/2013 | Mazumdar | B60L 7/10 |
| | | | 104/289 |
| 8,550,008 B2 * | 10/2013 | Mazumdar | B60L 7/10 |
| | | | 104/289 |
| 8,583,303 B2 * | 11/2013 | Bastien | E21F 13/00 |
| | | | 701/22 |
| 8,587,260 B2 | 11/2013 | Kumar | |
| 8,639,421 B2 | 1/2014 | Harnisch et al. | |
| 8,651,209 B2 * | 2/2014 | Hartjen, III | B60K 6/28 |
| | | | 180/65.29 |
| 8,660,760 B2 | 2/2014 | Piipponen et al. | |
| 8,692,647 B2 | 4/2014 | Bailey et al. | |
| 8,718,889 B2 | 5/2014 | Jensen | |
| 8,874,294 B2 * | 10/2014 | Qian | B60L 7/06 |
| | | | 246/226 |
| 8,893,830 B2 * | 11/2014 | Ruth | B60L 5/36 |
| | | | 180/2.1 |
| 8,950,526 B2 | 2/2015 | Bullock | |
| 9,022,153 B2 * | 5/2015 | Tojima | B60L 5/24 |
| | | | 180/167 |
| 9,056,558 B2 * | 6/2015 | Zimmerman | B60L 5/36 |
| 9,242,633 B2 * | 1/2016 | Forslow | B60K 6/28 |
| 9,283,866 B2 * | 3/2016 | Zimmerman | B60M 1/12 |
| 9,452,679 B2 * | 9/2016 | Kikuchi | B60L 3/00 |
| 9,481,259 B2 * | 11/2016 | Choi | B60L 11/1812 |
| 9,507,360 B2 * | 11/2016 | Tojima | B60M 3/06 |
| 9,623,755 B2 * | 4/2017 | Zimmerman | B60L 5/085 |
| 2004/0225435 A1 * | 11/2004 | Ogawa | B60K 6/46 |
| | | | 701/532 |
| 2004/0263099 A1 | 12/2004 | Maslov et al. | |
| 2007/0272116 A1 | 11/2007 | Bartley et al. | |
| 2009/0284022 A1 | 11/2009 | Usselman et al. | |
| 2010/0025160 A1 | 2/2010 | Bojji et al. | |
| 2010/0291418 A1 | 11/2010 | Zhou et al. | |
| 2010/0332061 A1 * | 12/2010 | Forslow | B60W 10/24 |
| | | | 701/22 |
| 2011/0094841 A1 * | 4/2011 | Mazumdar | B60L 7/10 |
| | | | 191/33 R |
| 2011/0301794 A1 * | 12/2011 | Bastien | E21F 13/00 |
| | | | 701/22 |
| 2012/0175209 A1 * | 7/2012 | Mazumdar | B60L 7/10 |
| | | | 191/2 |
| 2012/0217074 A1 | 8/2012 | Rudinec | |
| 2012/0273285 A1 * | 11/2012 | Jensen | B60K 1/04 |
| | | | 180/65.1 |
| 2012/0316717 A1 | 12/2012 | Daum et al. | |
| 2012/0321914 A1 | 12/2012 | Ventura et al. | |
| 2013/0164580 A1 | 6/2013 | Au | |
| 2013/0183571 A1 | 7/2013 | Miyazaki et al. | |
| 2014/0021780 A1 * | 1/2014 | Choi | B60L 11/1812 |
| | | | 307/9.1 |
| 2014/0032006 A1 * | 1/2014 | Tojima | B60M 7/00 |
| | | | 700/295 |
| 2014/0365052 A1 | 12/2014 | Kouhia et al. | |
| 2015/0002056 A1 * | 1/2015 | Young | H02P 4/00 |
| | | | 318/376 |
| 2015/0104676 A1 | 4/2015 | Okata et al. | |
| 2016/0084236 A1 | 3/2016 | Kellinger et al. | |
| 2016/0264000 A1 * | 9/2016 | Zimmerman | B60M 1/12 |

FOREIGN PATENT DOCUMENTS

| | | | |
|---|---|---|---|
| CA | 2851307 A1 | 12/2014 | |
| EP | 2810809 A1 | 12/2014 | |
| GB | 2457499 A | 8/2009 | |
| WO | 2010061058 A1 | 6/2010 | |
| WO | WO-2010132443 A1 * | 11/2010 | B60L 8/00 |
| WO | 2015039542 A1 | 3/2015 | |

* cited by examiner

SYSTEM AND METHOD FOR PROVIDING POWER TO A MINING OPERATION

BACKGROUND OF THE INVENTION

The present invention relates generally to providing electrical power to a mine. Specifically, electrical power captured by a kinetic energy capture system associated with an electric vehicle may charge the on board battery of the vehicle, which may then be discharged into the mine's power grid.

Subsurface mining operations may consume large amounts of energy. The mine power grid may provide electrical power to many different systems, including but not limited to environmental controls, ore and miner elevators, and mining vehicles. Power costs may be a significant portion of the operating costs of the mine. For mine operations controlled from a subsurface location, transmitting the power from the surface may be inefficient.

An additional factor in providing power to a mine is controlling emissions, which must be evacuated from the mine to maintain a habitable atmosphere. Emissions in the mine may prove expensive to control. For example, mine vehicles may generate emissions. Generating power at a subsurface location may produce unwanted or expensive to control emissions. Mine vehicles may also generate unwanted heat, which may be disadvantageous in an already hot mine.

Systems and methods that can produce inexpensive power in a mine without contributing emissions or heat to the mine environment would provide operational and cost advantages.

SUMMARY OF THE INVENTION

Various embodiments of systems and methods for using kinetic energy capture technologies to charge battery-powered mining vehicles and, due to weight differences between transporting a load such as ore, waste rock, and/or equipment, downhill from an ore face to a chamber and driving an empty vehicle back uphill to the ore face, provide an excess charge to the batteries. The batteries will eventually reach a maximum charged state and may be dissipated by discharging the battery's charge into the mine's power grid to run various operational systems, like environmental controls, conveyors, lights, and any other type of mining operations system.

In one aspect, the invention provides a system for employing gravity to provide electrical power for mining operations in a mine, wherein the mine having a shaft extending downward from the earth's surface to a chamber containing a power grid for powering the mining operations, a deposit having an ore face positioned between the chamber and the earth's surface, and a ramp extending at an incline between the ore face to the chamber. The system comprises a battery associated with a zero-emissions vehicle, wherein the battery is configured to be charged by a kinetic energy capture system associated with the vehicle when the zero-emissions vehicle travels on the ramp from the ore face to the chamber while carrying a load. The system also includes a discharging device disposed in the chamber, wherein the discharging device is configured to discharge energy out of the battery and into the power grid when the battery is attached to the discharging device.

In another aspect, the invention provides a system for employing gravity to provide electrical power for mining operations in a mine, wherein the mine has a shaft extending downward from the earth's surface to a chamber containing a power grid for powering the mining operations, a deposit having an ore face positioned between the chamber and the earth's surface, and a ramp extending between the ore face and the chamber. The system comprises a zero-emissions vehicle including a kinetic energy capture system and a battery configured to power the zero-emissions vehicle when attached to the zero-emissions vehicle. The battery is configured to receive power from the kinetic energy capture system when the zero-emissions vehicle travels down the ramp carrying a load from the ore face to the chamber. The system further includes a discharging device configured to discharge energy out of the battery and into the power grid when the battery is attached to the discharging device.

In another aspect, the invention provides a method for powering a mining operation, the method comprising the steps of (1) loading a vehicle powered by a battery with a load from a deposit, wherein the vehicle is configured to capture the kinetic energy of the vehicle to charge the battery; (2) driving the loaded vehicle down a ramp to a chamber; (3) capturing kinetic energy while driving the loaded vehicle; (4) charging the battery to a predetermined discharge level using captured kinetic energy; and (5) discharging the charged battery to a predetermined use level.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Providing power to sub-surface mining operations can present various challenges. For deep mines, transmitting the energy from the surface may be inefficient, and generating the power at depth may generate toxic emissions that are costly to dissipate and control. Various embodiments of systems and methods for using kinetic energy capture technologies to charge battery-powered mining vehicles and, due to weight differences between transporting ore from an ore face to a chamber and driving an empty vehicle back to the ore face, provide an excess charge to the batteries. The batteries will eventually reach a maximum charged state and may be dissipated by discharging the battery's charge into the mine's power grid.

Figure 1:
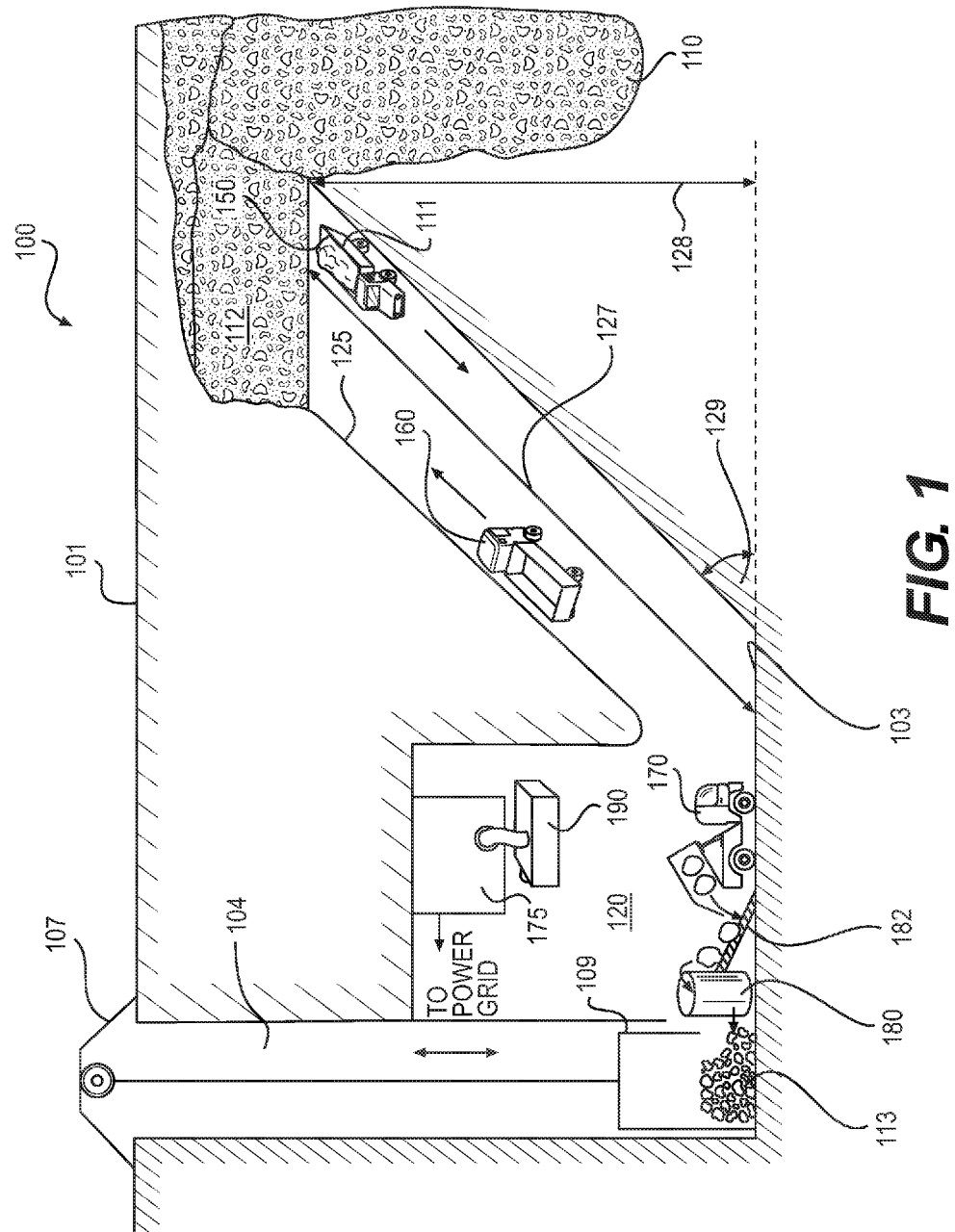
FIG. 1 shows an embodiment of a mining operation.
Figure 3:
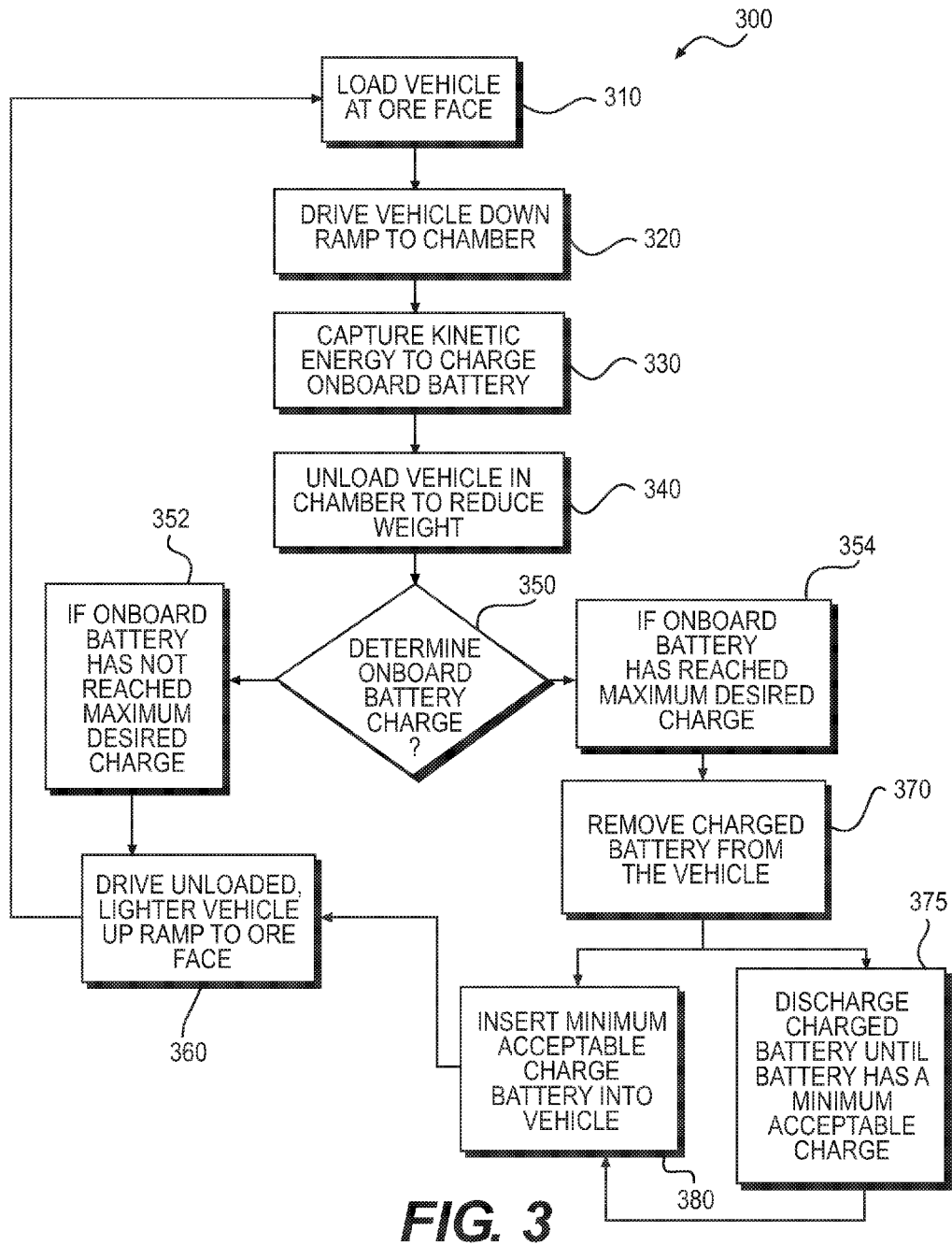
FIG. 3 shows a flowchart of an embodiment of a method of using gravity to power a mining operation.

FIG. 1 shows an embodiment of the operations of a shaft mine 100. Mine 100 includes an ore deposit 110 disposed beneath a surface 101. The components of shaft mine 100 may be used for reference in discussing the systems and methods for providing power to the mine, an embodiment of which is shown in FIG. 3. Shaft mine 100 may be any type of mine known in the art that involves transporting ore within the mine, particularly those mines that are configured so that ore is transported by a vehicle from a higher elevation to a lower elevation within a mine. Shaft mine 100 has been simplified from many different possible mine configurations for the sake of clarity in this description.

In the following discussion, directional and relative terms may be used. "Above", "over", "high", and "higher" refer to positions closer to surface 101 than another relative position. "Below", "beneath", "under", "low", and "lower" refer to positions further away from surface 101 than another relative position. "Up" refers to a direction towards surface 101. "Down" refers to a direction away from surface 101.

An excavation such as a vertical shaft 104 or an incline shaft (not shown) extends from surface 101 to a collection level 103. Shaft 104 may be any type of shaft known in the art, such as a vertical shaft. Collection level 103 may be positioned at any depth within the mine, but in some embodiments, collection level 103 may be positioned below deposit 110 as shown in FIG. 1.

Shaft 104 may terminate at collection level 103 in or proximate a chamber 120. Chamber 120 may be a room formed in the mine and configured to house various mining operations and controls. Chamber 120 may contain or house various aspects of the mining operation, such as containing an ore receiving and/or processing station and/or access to the mine power grid or other mining operation control systems. In some embodiments, collection level 103 may form a floor or part of a floor of chamber 120.

A hoist 107 may be associated with shaft 104. Hoist 107 may be positioned at surface 101. Shaft 104 may be provided with a mine cage 109 or ore elevator to transport ore to surface 101. Hoist 107 may be configured to lift mine cage 109 using known methods. As shown in FIG. 1, mine cage 109 may open into chamber 120. Chamber 120 may include other provisions for handling ore, such as a crusher 180 that may be configured to crush the ore extracted from deposit 110 into smaller pieces so that mine cage 109 may be filled more efficiently and/or the more may be moved more easily. A conveyor system such as conveyor system 182 may be provided to move ore from ore transportation vehicles like unloading vehicle 170 into crusher 180 and/or mine cage 109.

In some embodiments, the extraction operations occur at an ore face 112. As is known in the art, extraction operations may include any method of removing ore from the ore face, such as cutting, drilling, and blasting. Extracted ore may then be loaded onto a vehicle for transportation to a secondary location, such as collection level 103 for conveyance to surface 101. The secondary location may include additional processing, such as crushing the ore in crusher 180 for easier conveyance to surface 101. In some embodiments, the secondary location may be chamber 120, and collection level 103 may be a floor in chamber 120.

In some mines, ore face 112 may be positioned closer to surface 101 than the secondary location such as chamber 120. The height 128 of ore face 112 above collection level may be any height. In some embodiments, height 128 may be any height sufficient to place collection level entirely beneath deposit 110. In some embodiments, height 128 may be any height between surface 101 and a bottom of deposit 110.

An ore load such as ore load 111 may be transported from ore face 112 to chamber 120 in one or more vehicles such as loaded vehicle 150. Because ore face 112 and the extraction operation occurs above chamber 120, loaded vehicle 150 may convey ore load 111 to chamber 120 by driving down a ramp such as ramp 125. Ramps within mines are well known.

Ramp 125 may be a straight, curved, or multilevel path extending between an extraction point and the collection level. In the embodiment shown in FIG. 1, ramp 125 is shown as a simple straight path which is wide enough to allow for vehicles to simultaneously travel towards and away from the extraction point at ore face 112. Ramp 125 may have a length 127 as measured along a surface of ramp 125 between ore face 112 and collection level 103. Length 127 may be any length sufficient to connect ore face 112 and collection level. In some embodiments, length 127 may range from several hundred feet to several miles.

Ramp 125 may have a grade defined by ramp angle 129. Ramp angle 129 may be any angle that permits a vehicle to easily travel on the surface of ramp 125. In some embodiments, the grade of ramp 125 may range from a 6% grade to a 20% grade. In some embodiments, the grade may be even higher, such as when rail cars are being utilized. The grade may be up to 30% in such embodiments. In other embodiments, the grade of ramp 125 may be lower than 6% or greater than 30%.

Figure 2:
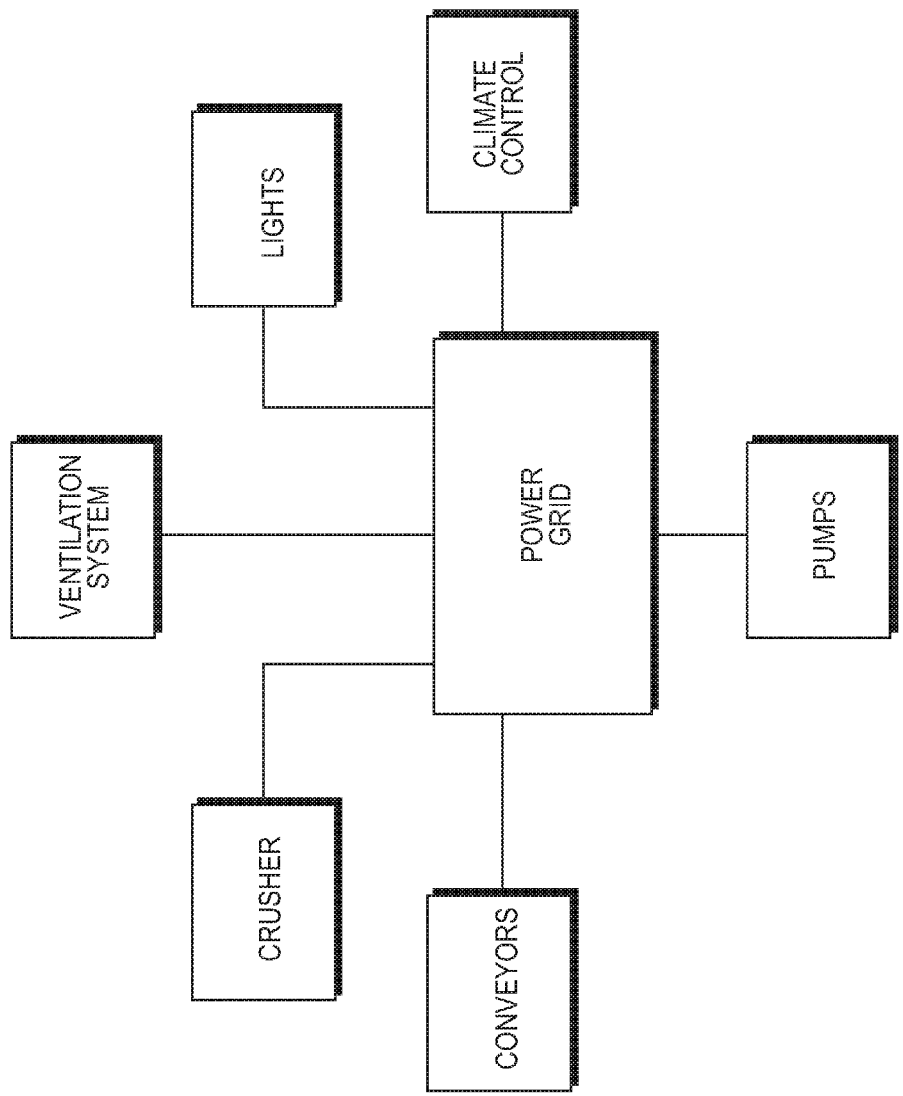
FIG. 2 shows an embodiment of various mining operation elements that may be powered by a power grid in a mine.

Various systems within the mine may draw power from the mine's power grid. FIG. 2 shows examples of some systems within a mine that may be run by the mine's power grid. The examples in FIG. 2 are not a comprehensive list for use in every mine, and some mines may use different combinations of these electrical systems, additional electrical systems, fewer electrical systems, or different systems entirely. Examples of such systems include the ventilation system for maintaining appropriate air quality within the mine. Lights in the mine may be run from the power grid. Climate control, such as air conditioning, fans, and/or heaters may draw power from the power grid. Pumps for controlling water within the mine or for directing water to an ore face for assisting in extraction operations may be powered by the power grid. Conveyors for moving ore, equipment, and/or personnel within the mine may use power from the power grid. A crusher for breaking ore down into smaller or more uniform pieces than extraction can produce may be part of the mine's electrically powered operations.

The energy requirements for running a mining operation may be intensive and expensive. FIG. 3 shows an embodiment of a method 300 that uses the configuration of a mine such as mine 100 where the ore is conveyed from an extraction point down a ramp to a collection level in a vehicle to produce energy for powering the mining operations. A first step 310 of method 300 includes loading a transport vehicle with ore at the extraction point. In one embodiment, such as the embodiment shown in FIG. 1, vehicle 150 has been provided an ore load 111 at ore face 112. Load 111 may be anything capable of increasing the mass of the transport vehicle, including but not limited to ore, waste rock, equipment, personnel, and/or combinations thereof. Ore face 112 is the extraction point for mine 100. The loading of ore into a vehicle may be achieved using any method known in the art. For example, heavy machinery such as a bucket loader may introduce ore into the vehicle. In another example, a conveyor may transfer extracted ore from the extraction point to the transport vehicle. The conveyer may be a separate component of the mine or the conveyor may be integrated into the extraction machinery. In another example, miners may manually load ore into the transport vehicle. The weight of the vehicle at this point is the weight of the unloaded vehicle plus the weight of the ore load.

A second step 320 of method 300 includes driving the vehicle down a ramp to a collection point. In the embodiment of mine 100 shown in FIG. 1, ramp 125 connects the ore face 112 or extraction point with the collection level 103, which may be a floor of chamber 120. In some embodiments, the vehicle is a zero emissions vehicle. In such embodiments, the vehicle may be a battery-powered electric vehicle. The vehicle's onboard battery may be removable and rechargeable. In some embodiments, the vehicle's onboard battery may be configured for rapid and easy extraction and installation into the vehicles so that any miner may be able to perform these battery swapping functions. For example, the battery may be part of a modular system that provides an easily changed battery and a housing configured to withstand harsh mine conditions. An example of a suitable battery and battery system is the modular battery and bus system described in US Patent Application Publication Number 2015/0086825 to Huff et al., which patent application is incorporated herein by reference in its entirety. Additionally, appropriate batteries and battery systems may be obtained from Artisan Vehicle Systems of Camarillo, Calif.

A third step 330 of method 300 includes capturing the kinetic energy of the vehicle as the loaded vehicle travels down the ramp from the extraction point to the collection level. Third step 330 also includes charging the onboard battery with that captured kinetic energy. Kinetic energy capture systems are well known in the art. Examples of kinetic exergy capture systems include regenerative braking systems, which use reverse motion of the wheels of a vehicle to turn the electric motor into a generator, and piezoelectric systems, which use the kinetic energy of a system to squeeze crystals to produce electricity. The captured kinetic energy is converted into electrical energy and stored in the vehicle's onboard battery. Technologies for charging an onboard battery using captured and converted kinetic energy are also well known in the art, such as those systems associated with regenerative braking systems in electric and hybrid vehicles.

A fourth step 340 of method 300 includes unloading the ore from the vehicle to reduce the weight of the vehicle. This step is shown in FIG. 1, where unloading vehicle 170 is positioned on collection level 103 in chamber 120. The unloading may occur using any method known in the art. In the embodiment shown in FIG. 1, unloading vehicle 170 is dumping the ore from a bed like a dump truck onto a conveyor 182. In other embodiments, heavy machinery may be used to remove the lore load from unloading vehicle 170, or the ore may be removed from unloading vehicle 170 and placed into a bin, pile, or other storage location to await additional processing or additional transportation. Removing the ore from the vehicle reduces the weight of the vehicle. In some embodiments, the weight reduction may be significant, with the ore load weighing a thousand pounds or more. In other embodiments, the weight reduction may be less, such as when the ore load weight less than a thousand pounds. At this point in the method, the weight of the vehicle is only the weight of the unloaded vehicle.

A fifth step 350 of method 300 includes determining the charge or state of the onboard battery. This may be accomplished using any method known in the art. For example, a dashboard in the vehicle may display this information in real time with constant measuring of the battery charge. The vehicle operator may then determine if the battery has reached the predetermined discharge level. Such constant measuring of a battery charge level is well known and common in electric and hybrid vehicles. In other embodiments, a controller associated with the battery may be equipped to measure the battery charge and for remote communication, such as wireless or wireline communication. The controller may be any type of mechanism known in the art capable of performing these functions. For example, the controller may be a computer that includes a processer and an associated memory as well as a transmitter, receiver, or transceiver. The transceiver may be configured to transmit the information using any known method and communication protocol, such as radio signals, Bluetooth signals, optical signals, combinations of these signals, or the like. When within chamber 120 or in another collection location, the controller associated with the battery may broadcast the charge to a receiving station, such as a computer, handheld device, or other mechanism configured to receive information from the controller. The receiving station may include a display so that a technician may monitor the incoming data regarding the battery. The receiving station may include programming so that the receiving station sends or emits a signal when the charge of the battery has reached a predetermined level. The signal may be received by a technician or the vehicle operator.

Obtaining the battery charge information in fifth step 350 is a decision point in method 300. If the battery has not yet reached a predetermined level such as a maximum desired charge, then the method moves to sixth step 360. Sixth step 360 includes driving the unloaded, lighter vehicle back up the ramp to the extraction point. In FIG. 1, sixth step 360 is shown where unloaded vehicle 160 is driving up ramp 125 in the opposite direction as loaded vehicle 150. Unloaded vehicle 160 uses battery power to propel the vehicle up ramp 125 to the extraction point, ore face 112. During this operation, some portion of the battery charge of the onboard battery will be consumed. However, due to the weight difference between a loaded vehicle and an unloaded vehicle, the consumption of power from the battery required to drive an unloaded vehicle up the ramp is less than the amount of energy captured by a kinetic energy capture system while driving a loaded vehicle down the ramp. This aspect of the method for providing power to a mine is discussed in greater detail below with respect to FIG. 5.

If, however, the battery has reached a predetermined discharge level or state, such as a maximum desired charge, method 300 moves to seventh step 370. Seventh step 370 involves removing the charged battery from the vehicle. Seventh step 370 may be accomplished using any method known in the art. Seventh step 370 may be accomplished quickly and easily if the onboard battery is a modular battery such as is available from Artisan Vehicle Systems. In some embodiments, seventh step 370 may be optional, as the battery need not be removed from the vehicle in order to proceed to the eighth step 375 in method 300: discharging the battery into the mine's power grid.

Eighth step 375 of method 300 includes attaching the battery to a discharging device, such as discharging device 175 shown in FIG. 1. Discharging the battery transfers the stored energy in the battery to the mine's power grid via the discharging device. Transferring the energy from the battery into the mine's power grid may be accomplished using any method known in the art. The power grid may contain energy storage devices like capacitors and batteries to receive and store the transferred energy.

In the embodiment shown in FIG. 1, a discharging battery 190 is attached to discharging device 175 using a cable. In other embodiments, discharging device 175 may be configured so that discharging battery 190 may inserted into a receiving slot in discharging device 175. In the embodiment shown in FIG. 1, discharging battery 190 has been removed from a vehicle. In other embodiments, discharging battery 190 may remain within or otherwise attached to the vehicle, while discharging battery 190 is attached to discharging device 175, such as through a port disposed on or through the body of the vehicle.

Discharging device 175 may be any type of discharging device known in the art. In some embodiments, discharging device 175 may include a grid connection, one or more networks (e.g., the Internet), a remote terminal (e.g., a personal computer), and a remote data store. The discharging device 175 may support various AC systems. For example, discharging device 175 may support an AC system associated with an AC supply. For example, discharging device 175 may support various voltages, current, power, frequencies (e.g., 50 Hz, 60 Hz), number of phases, and the like. In the example, discharging device 175 may support a 480/600 volt AC voltage.

Similarly, discharging device 175 may support various DC systems. For example, discharging device 175 may support a DC system associated with a battery. For example, discharging device 175 may support a 480 volt DC voltage. In other examples, discharging device 175 may support a 240 volt DC voltage. In some examples, discharging device 175 may support a 65 kW DC power output. In other examples, discharging device 175 may support a 100 kW DC power output.

The bi-directional converter of discharging device 175 may use various types of converter topologies including, for example, buck, boost, buck-boost, and the like. Similarly, the bi-directional converter may use various types of inverter topologies including, for example, a grid-tie inverter system, a square wave, modified square wave, modified sine wave, pure sine wave, and the like. The topologies used in the bi-directional converter may support a bi-directional function. As used herein, bi-directional DC/AC converter may include a converter configured to (1) convert from the DC system to the AC system and (2) convert from the AC system to the DC system. In some embodiments, the bi-directional converter may include an AC to DC converter for converting from the AC system to the DC system and a DC to AC inverter for converting from the DC system to the AC system. In other embodiments, a single converter is used to convert between the AC and the DC systems.

Additional details regarding one possible embodiment of a discharging device for use in a method for providing power to a mine such as method 300 are described in U.S. patent application Ser. No. 14/529,853 (filed by Huff et al. on Oct. 31, 2014) which is incorporated herein by reference in its entirety.

The battery is discharged into the mine's power grid until the battery charge has reached a minimum acceptable charge or a predetermined use level. This process may take several minutes to several hours, depending upon the capacity of the battery and the charged state of the battery. The minimum acceptable charge may be any charge capable of powering the vehicle back up the ramp to the extraction point. In some embodiments, the minimum acceptable charge may be a 20% battery charge. In other embodiments, the minimum acceptable charge may be higher or lower than 20% depending upon various factors including but not limited to the battery capacity, the consumption rate of power by the vehicle, the length of the ramp, and other factors.

The discharging device may be configured to also provide power to an onboard battery. For example, if a battery charge were to fall below the minimum acceptable charge, such as due to unanticipated system losses or operator error, the onboard battery may be charged to any desired level using the discharging device.

Once the battery has been discharged to the minimum acceptable level, the battery can be disconnected from the discharging device. In some embodiments, a ninth step 380 of method 300 may then be executed. Ninth step 380 includes attaching the minimum acceptable charge battery to an unloaded vehicle. In some embodiments, ninth step 380 involves reattaching the discharged battery to the same vehicle from which the discharged battery was removed. In such embodiments, the unloaded vehicle may remain proximate the battery for the duration of discharge. Such embodiments are depicted and discussed in greater detail below with respect to FIG. 6. In other embodiments, ninth step 380 includes providing the discharged battery to a different vehicle. In such embodiments, multiple vehicles are in use in the mine at any given time. Therefore, the discharged battery may be stored proximate the discharging device until a vehicle with a fully charged onboard battery arrives at the discharging device. The fully charged onboard battery of the vehicle may be removed from the vehicle for discharging while the waiting discharged battery is connected to the unloaded vehicle so that the unloaded vehicle may resume operations immediately. Such embodiments are depicted and discussed in greater detail below with respect to FIG. 7. As such, in some embodiments, eighth step 375 and ninth step 380 may occur simultaneously.

Once ninth step 380 has been completed, the process continues at sixth step 360. The unloaded vehicle with the minimum acceptable charge battery uses the battery charge to drive back up the ramp to resume method 300 at first step 310. Method 300 may thus continue for many iterations of charging the onboard battery using a kinetic energy capture system and discharging the battery into the mine's power grid.

Figure 4:
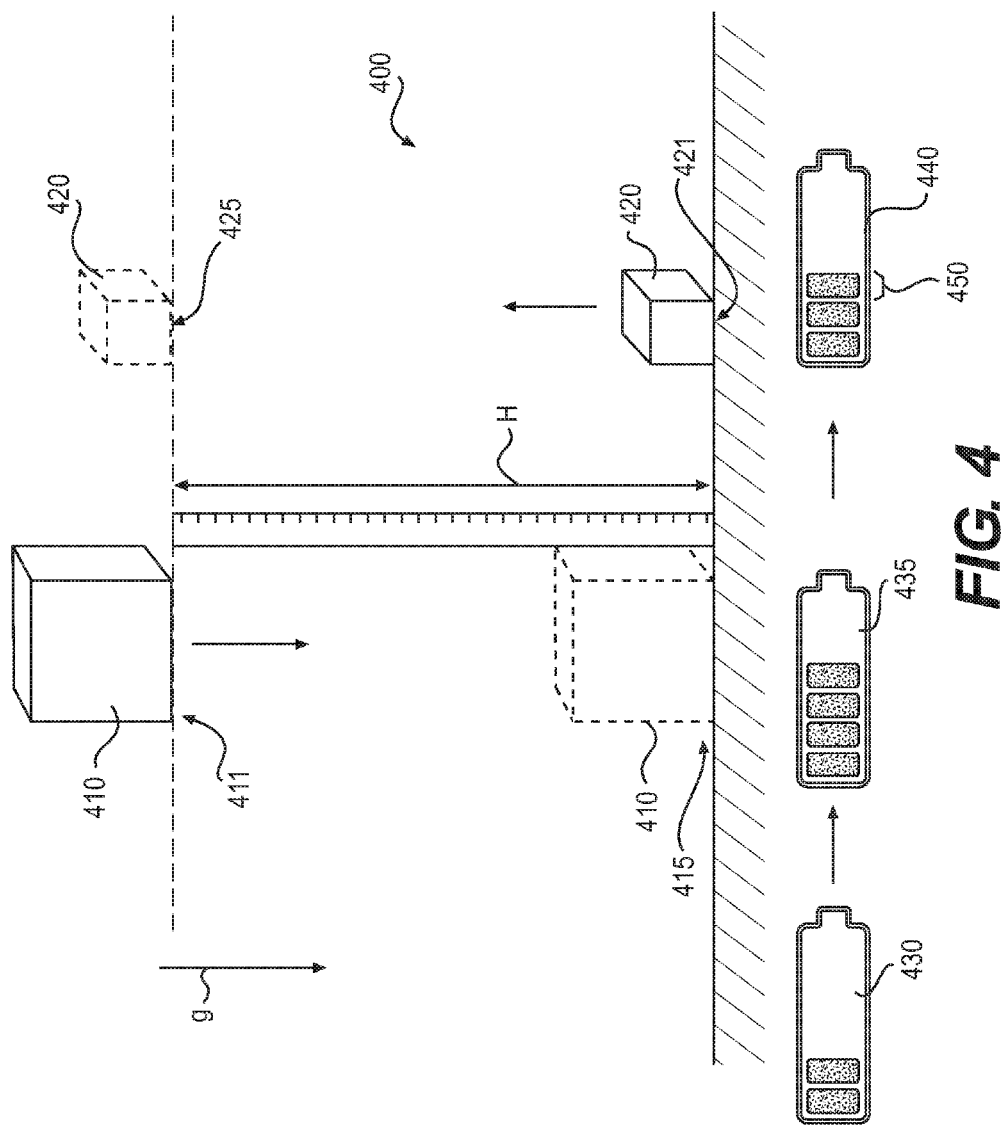
FIG. 4 shows a schematic embodiment of how gravity can be used to provide energy for capture.

Method 300 employs the weight differential between the loaded vehicle and the unloaded vehicle to advantage in charging the battery. FIG. 4 is a diagram that shows conceptually how transporting a heavier mass from a height to a lower level and a lighter mass from the lower level back to the height may produce energy. First mass 410 is shown in a first position 411 at a height H. The gravitational force g gives first mass 410 a weight. At height H, first mass 410 has a first potential energy, and a stored energy system 430 associated with first mass 410 may have a first state. Stored energy system 430 may be a capacitor or a battery.

Moving first mass 410 down to a second position 415 requires the application of a force to fight the acceleration due to gravity so that first mass 410 moves through height H to second, lower position 415 in a controlled fashion and does not just fall in an uncontrolled manner. That force may be captured and converted to electrical energy using any known kinetic energy capture system, such as regenerative braking or piezoelectric technologies. The stored energy system 430 may increase its charge to second state 435 as the energy is captured.

Stored energy system 430 may then be associated with a second mass 420 that is positioned in third position 421. Third position 421 is at the same height as second position 415. However, second mass 420 is lighter than first mass 410. Second mass 420 may use energy from stored energy system 430 to raise second weight 420 from third position 421 to a fourth position 425. Fourth position 425 is at height H above third position 421. Energy is extracted from stored energy system 430 to overcome gravity to lift second mass 420 to height H. However, because second mass 420 is lighter than first mass 410, the amount of energy expended to raise second mass 420 to height H may be less than the amount of energy captured by stored energy system 430 when controlling the lowering of first, heavier mass 410 from height H to second position 415. Therefore, stored energy system 430 may be left with a surplus energy charge 450. Thus, lowering a heavy weight and raising a light weight through the same distance may produce a net surplus of stored energy. The net surplus 450 may be small but non-negligible. Therefore, multiple iterations of lowering heavy masses and raising light masses may eventually fully charge stored energy system 430.

Figure 5:
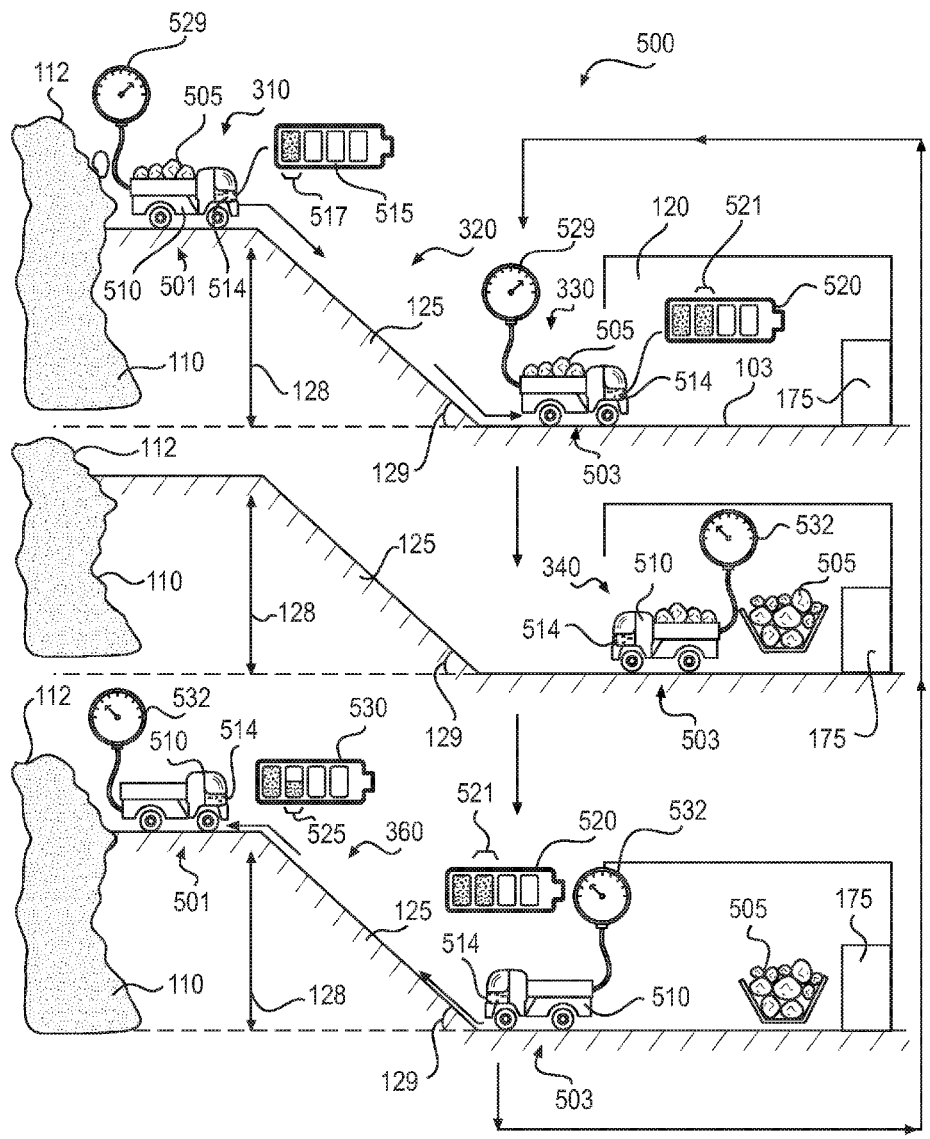
FIG. 5 shows an embodiment of how a gravity capture system can be used in a mining setting.

For a more concrete example of this principle, FIG. 5 shows a trip cycle or a charging cycle in mine 100 that produces a surplus charge in a rechargeable onboard battery 514 according to an embodiment of method 300 shown in FIG. 3. In an initial position 501 proximate ore face 112, according to first step 310, a load 505 of ore is loaded into vehicle 510. Because vehicle 510 is loaded with ore, vehicle 510 has a loaded weight 529. Loaded weight 529 may be any weight and represents the weight of vehicle 510 plus the weight of load 505.

Vehicle 510 is powered by battery 514, which is removably attached to vehicle 510. Battery 514 may be any type of rechargeable battery suitable for use in a mine vehicle.

At initial point 501, battery 514 has an initial state 515 with an initial charge 517. Initial charge 517 may be any charge that battery 514 is capable of maintaining and which will power vehicle 510 from initial point or high point 501 proximate ore face 112 to collection location 103. Initial charge 517 is also less than a full charge so that battery 517 is capable of accepting an additional charge from a kinetic energy capture system associated with vehicle 510. In some embodiments, initial charge 517 may be a 20% charge of a typical electric vehicle battery. In other embodiments, the initial charge 517 may be different.

In the embodiments shown in FIG. 5 and FIG. 1, collection location 103 is a floor of chamber 120. Initial point 501 is connected to collection location 103 by ramp 125. Ramp 125 has height 128 and a grade 129. Following second method step 320, vehicle 510 transports load 505 down ramp 125 to a low position 503, which is proximate collection location 103.

As vehicle 510 travels down ramp 125 according to third step 330, a kinetic energy capture system associated with vehicle 510 converts selected movements of vehicle 510 from mechanical motion into electrical energy and stores that captured electrical energy in battery 514. The selected movements of vehicle 510 may be any movement of vehicle 510, but may particularly be those movements associate with controlling vehicle 510 against the pull of gravity down ramp 125. For example, the selected movement may be braking to slow vehicle 510 as vehicle 510 travels down ramp 125. In such an embodiment, kinetic energy capture system may include a regenerative braking system, which may be any type of regenerative braking system known in the art. In another embodiment, the selected movement may be the movement of a coil spring in one or more struts associated with the wheels of vehicle 510. In such an embodiment, the kinetic energy capture system may include a system for converting the energy released by the coiling and uncoiling of the springs of the struts as vehicle 510 passes over uneven ground and/or while ore is loaded into the vehicle.

Once vehicle 510 reaches low point 503, the charge in battery 514 has increased to a second battery state 520 due to the kinetic energy capture. The added charge 521 from the trip down ramp 125 may vary depending upon various factors, such as the length of ramp 125, the slope of ramp 125, the grade of ramp 125, the efficiency of the kinetic energy capture system, the loaded weight 529 of vehicle 510, and other factors.

Once vehicle 510 has reached low point 503, load 505 may be unloaded from vehicle 510 according to fourth step 340 of method 300. Removing load 505 from vehicle 510 reduces the weight of vehicle 510 to an unloaded weight 532, which is exclusively the weight of vehicle 510. Unloaded weight 532 is less than loaded weight 529. In some embodiments unloaded weight 532 may be hundreds or thousands of pounds lighter than loaded weight 529, depending upon the size of load 505. In other embodiments, unloaded weight 532 may be other weight differentials.

Vehicle 510 may proceed to execute sixth step 360 of method 300 and travel back up ramp 125 to initial position 501 proximate ore face 112. Battery 514 provides the energy to the motor of vehicle 510 for the movement back up ramp 125. However, vehicle 510 is now at unloaded weight 532, which may be significantly less than loaded weight 529. Battery 514 may discharge while traveling back up ramp 125 as the vehicle's electric motor draws power from the battery 514 to propel vehicle 510 up the ramp. Because vehicle 510 is lighter when unloaded, the energy expenditure for traveling back up ramp 125 may not exceed the amount of added charge 521.

When vehicle 510 reaches initial position 501 to receive another load of ore, battery 514 may be in a third battery state 530. Third battery state 530 includes a net surplus charge 525. Surplus charge 525 is less than added charge 521 because some energy from battery 514 was used to convey vehicle 510 up ramp 125. However, surplus charge 525 is greater than initial charge 517, because the amount of energy captured by the kinetic energy capture system while vehicle 510 drives down ramp 125 with a heavy load 505 is greater than the amount of energy expended by conveying lighter vehicle 510 without a load back up ramp 125. Battery 514 is left with a net surplus energy charge.

FIG. 5 shows one trip cycle: driving a loaded vehicle 510 down ramp 125, unloading vehicle 510, and driving an unloaded vehicle 510 back up ramp 125 back to ore face 112. As shown in FIG. 5, one trip cycle may produce a net surplus energy charge but may not fully charge battery 514. Therefore, vehicle 510 may repeat first step 310 through sixth step 360 of method 300 for additional trip cycles in order to reach a fully charged state. The number of trip cycles may be two or more. In some embodiments, a fully charged state may be a 100% charge of battery 514. In other embodiments, a fully charged state may be any charge at which a discharge of energy into the mine's power grid may be efficient or otherwise desirable. In other embodiments, a single trip cycle may fully charge battery 514, such as if ramp 125 is very long or very steep, if load 505 is very heavy, or if battery 514 has low capacity.

Figure 6:
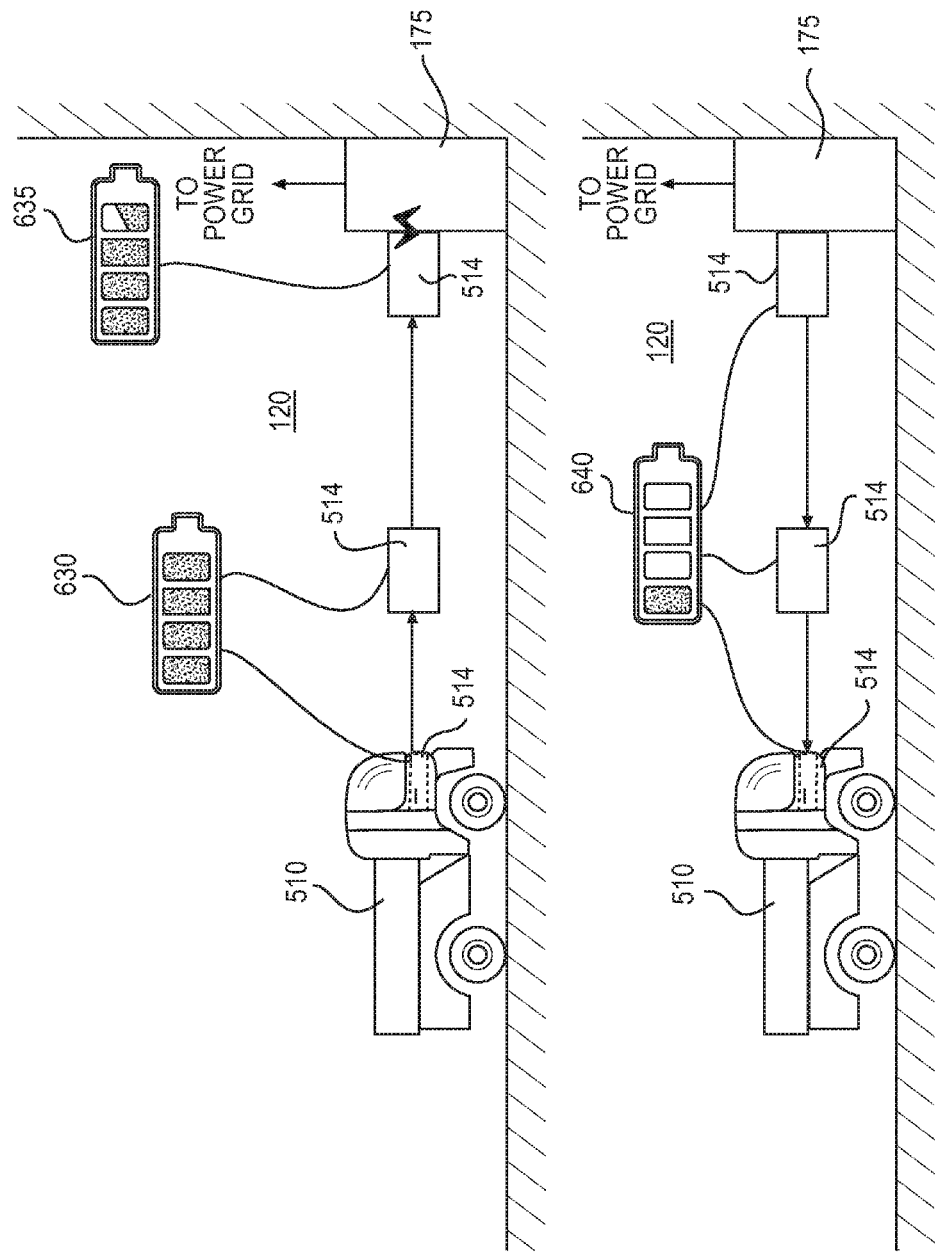
FIG. 6 shows an embodiment of discharging captured energy to a mine power grid.

FIG. 6 shows an embodiment of how energy may be extracted from battery 514 and transferred to the power grid. Once truck 510 has entered chamber 120, battery 514 may be tested to determine its charge, as discussed above in fifth step 350 as shown in FIG. 3. If the charge has reached a predetermined discharge level, such as 100% or greater than 80% or any other level selected to be sufficient to efficiently discharge battery 514, battery 514 may be removed from truck 510 and associated with discharging system 175 where battery 514 enters a discharging state 635. As discussed above, discharging system 175 may be a bidirectional charging system. Discharging system 175 is electrically linked to the mine's power grid. As power is drained from battery 514 due to the discharging, power is fed to the mine power grid through discharging system 175. The mine power grid may include capacitors, rechargeable batteries, or other provisions for receiving the discharged power from batter 514 via discharging system 175. The mine power grid may then use the discharged power to run the mine electrical systems, such as lights, climate control systems, ventilation systems, and the like.

Once battery 514 has been discharged to a minimal acceptable charge state 640, battery 514 may be disconnected from discharging system 175 and reconnected to vehicle 510. In some embodiments, the minimal acceptable charge may be a 20% charge. In other embodiments, the minimal acceptable charge may be the charge sufficient to drive vehicle 510 from chamber 120 to ore face 112 and at least partially back down the ramp after vehicle 510 has been reloaded with ore at ore face 112.

In the embodiment shown in FIG. 6, vehicle 510 waits in chamber 120 while battery 514 discharges to the minimal acceptable charge. The discharging process may require that battery 514 be connected to discharging system 175 for an hour or more. In those embodiments, vehicle 510 would be idle for the duration of discharge. Such idleness may be undesirable to the mining operation as inefficient, especially when vehicle resources may be limited.

Figure 7:
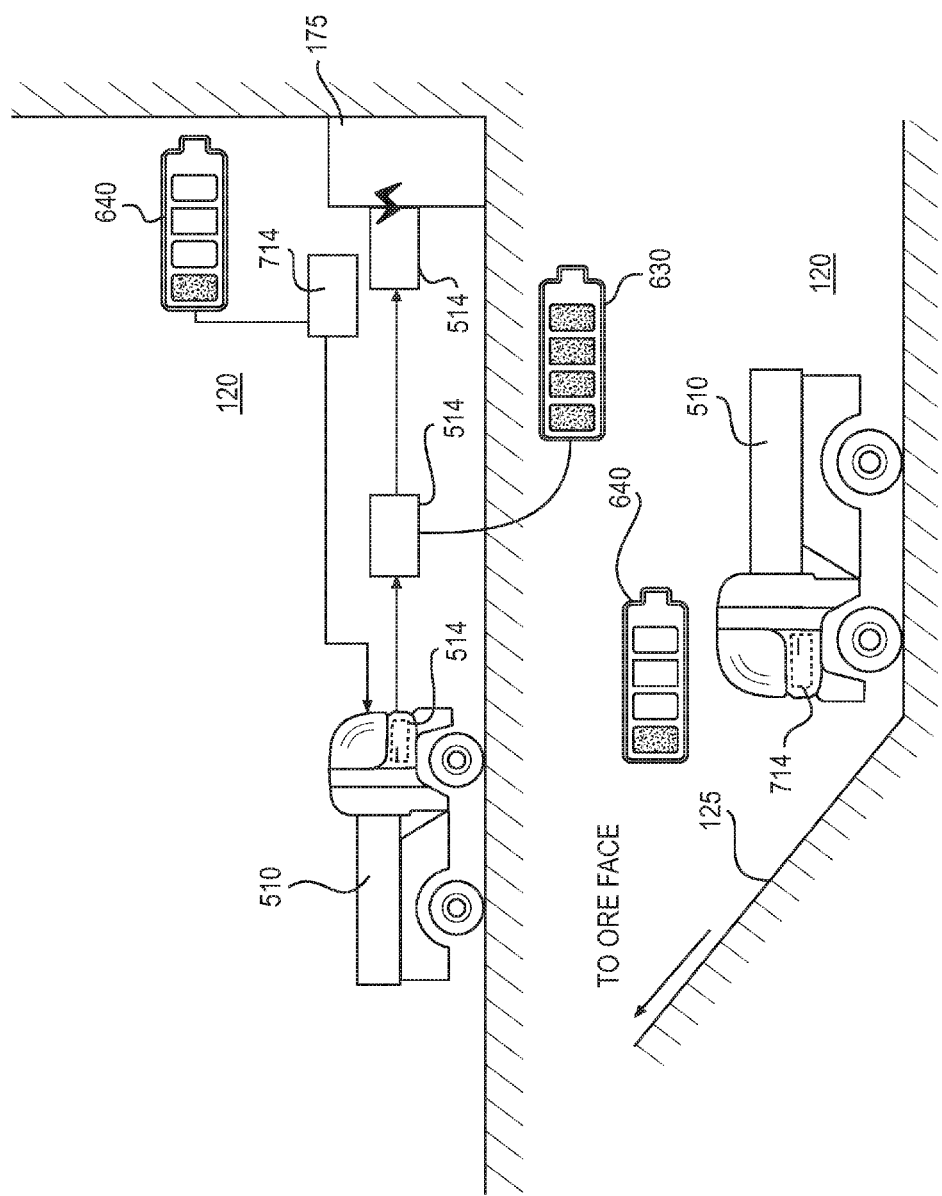
FIG. 7 shows another embodiment of discharging captured energy to a mine power grid.

FIG. 7 shows an alternate embodiment of how energy may be extracted from battery 514 and transferred to the power grid while avoiding idling a vehicle. Once vehicle 510 has entered chamber 120, battery 514 may be tested to determine its charge, as discussed above in fifth step 350 as shown in FIG. 3. If the charge has reached a predetermined level, such as 100% charge, greater than 80% charge, or any other level selected to be sufficient, battery 514 may be removed from truck 510 and associated with discharging system 175 where battery 514 enters a discharging state. As in the embodiment shown in FIG. 6, discharging system 175 is electrically linked to the mine's power grid. As power is drained from battery 514 due to the discharging, power is fed to the mine power grid through discharging system 175. The mine power grid may include capacitors, rechargeable batteries, or other provisions for receiving the discharged power from batter 514 via discharging system 175. The mine power grid may then use the discharged power to run the mine electrical systems, such as lights, climate control systems, ventilation systems, and the like. Battery 514 is then discharged to a minimal acceptable charge. In some embodiments, the minimal acceptable charge may be a 20% charge. In other embodiments, the minimal acceptable charge may be the charge sufficient to drive vehicle 510 from chamber 120 to ore face 112 and at least partially back down the ramp after vehicle 510 has been reloaded with ore at ore face 112.

In other embodiments, the minimal acceptable charge may be higher or lower than a 20% charge.

While battery 514 is discharging to a minimal acceptable charge state, a second battery 714 already at the minimal acceptable charge state 640 is retrieved from a storage location in chamber 120 or otherwise proximate discharging system 175. Second battery 714 is then connected to vehicle 510. Vehicle 510 may then travel back up ramp 125 to the ore face under the power provided by second battery 714 while the first battery 514 is discharging. In some embodiments, one spare battery such as second battery 714 may be provided. In other embodiments, more than one spare battery may be provided, particularly in embodiments where discharging system 175 may simultaneously discharge multiple batteries.

In the embodiments discussed above, shaft 104 is a vertical shaft. In other embodiments, an inclined shaft may be provided between the surface and the ore deposit. In such embodiments, the iterative kinetic energy capture process discussed above may be used even when initially building the ramp between the surface and the ore deposit as well as during ongoing mining operations.

Figure 8:
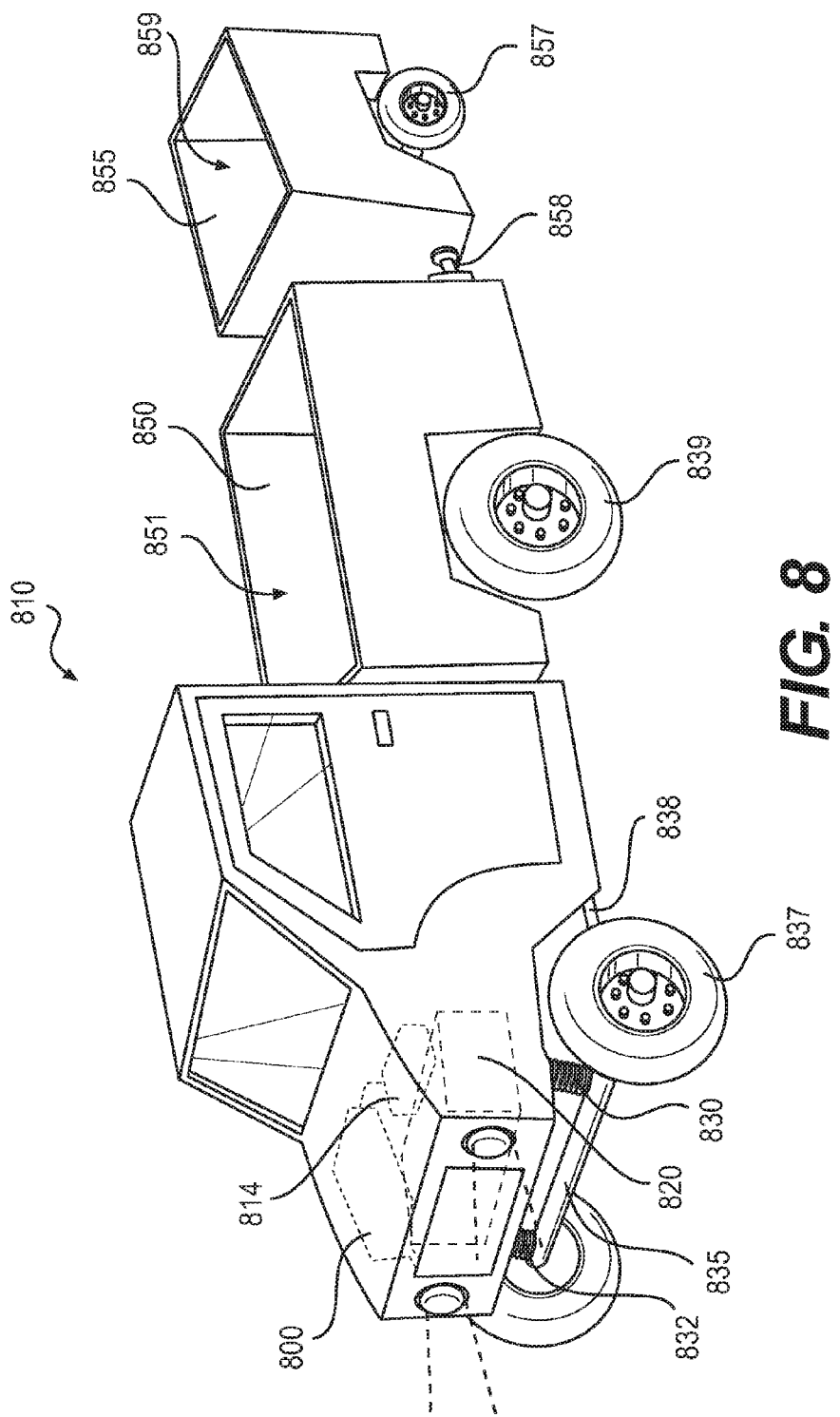
FIG. 8 shows an embodiment of a vehicle for use in mining operations, where the vehicle is equipped to capture kinetic energy.

FIG. 8 shows an embodiment of a zero emissions vehicle 810 suitable for use in a subterranean mine such as mine 100 and for implementing various embodiments of the method for providing power to a mine such as method 300 discussed above. Vehicle 810 may include an electric motor 800 which is powered by an onboard battery 814. Onboard battery 814 may be any type of battery known in the art, such as the batteries discussed above like battery 514. Vehicle 810 is provided with various standard vehicular mechanisms and capacities, such as a passenger cab 813 for receiving one or more operators, a vehicle bed 850 configured with a bed compartment 851. Vehicle 810 may be sized and shaped to operate comfortably in most or all areas of the subterranean mine, with sufficient width and height clearances to maneuver within intended use spaces. Vehicle 810 may be modular so that various parts may be transported from the surface within mine cage 109, shown in FIG. 1. Vehicle 810 may be configured to be assembled in chamber 120.

Bed compartment 851 may be sized and shaped to receive a load of ore. The size and shape of bed compartment 851 may vary depending upon the type of ore, the desired amount of ore per load, and the intended manner of loading. For example, bed compartment 851 is configured as an open-top bed so that ore may be loaded into bed compartment 851 from above, such as with a loader such as a bucket loader.

In some embodiments, vehicle 810 may be provided with an optional hitch wagon 855 so that additional ore per carry may be conveyed by vehicle 810 without impinging upon maneuvering clearances for operating vehicle 810 within the intended areas of the mine. Hitch wagon 855 may include a hitch 858, which may be any type of towing hitch known in the art capable of securely connecting hitch wagon 855 to vehicle 810 while pulling an intended load. Hitch wagon 855 may be configured in a similar manner to bed compartment 851, with a wagon compartment 859 configured to receive a load of ore in a similar fashion and in similar quantities as bed compartment 851. In other embodiments, wagon compartment 859 may be a different size and/or shape and/or configuration than bed compartment 851.

Vehicle 810 is provided with ground contacting elements for moving the vehicle 810 along the ground, such as a continuous track or, as shown in the embodiment in FIG. 8, one or more wheels on axles. The type of ground contacting element may be selected based upon the mine terrain and the intended load weights. The wheels may be solid or may include inflatable tires. Vehicle 810 may include any number of wheels, such as three, four, five, six, or more depending upon the intended use of the vehicle, such as the type of maneuvering, the intended load, and the traction capabilities of the wheel. In the embodiment shown in FIG. 8, four wheels are provided, including a front driver side wheel 837, a front passenger side wheel 836, and a rear wheel 839. A fourth rear wheel corresponding to rear wheel 839 is also provided but not shown in FIG. 8. All of these wheels may be the same size, or the front wheels may be a different size from the rear wheels.

All wheels may be mounted onto axles. For example, front wheels 837 and 836 may be mounted on an axle 835 associated with a drive train 838. Axle 835 and/or front wheel 837 may be attached to the body of vehicle 810 using any method known in the art. For example, a first strut 830 and a second strut 832 may be provided to attach axle 835 and/or front wheel 837 to the chassis of vehicle 810. First strut 830 and second strut 832 may be any type of strut known in the art configured to resist compression, such as a MacPherson strut employing coil springs. Drive train 838 may transfer force from the engine 800 to the wheels using any method known in the art.

Optional hitch wagon 855 may also include one or more wheels such as wheel 857. Wheel 857 may be mounted on an axle. Wheel 857 may or may not be linked to drive train 838.

Vehicle 810 is provided with a kinetic energy capture system 820 so that the method of providing power to the mine power grid discussed above may be implemented. Kinetic energy capture system 820 may be any type of kinetic energy capture system known in the art, such as a regenerative braking system. However, in other embodiments, kinetic energy capture system 820 may include a regenerative braking system as well as other kinetic energy capture systems. For example, first strut 830 and second strut 832 may be linked to a system that captures the energy generated by the spring motion of the struts as vehicle 810 passes over uneven ground.

Figure 9:
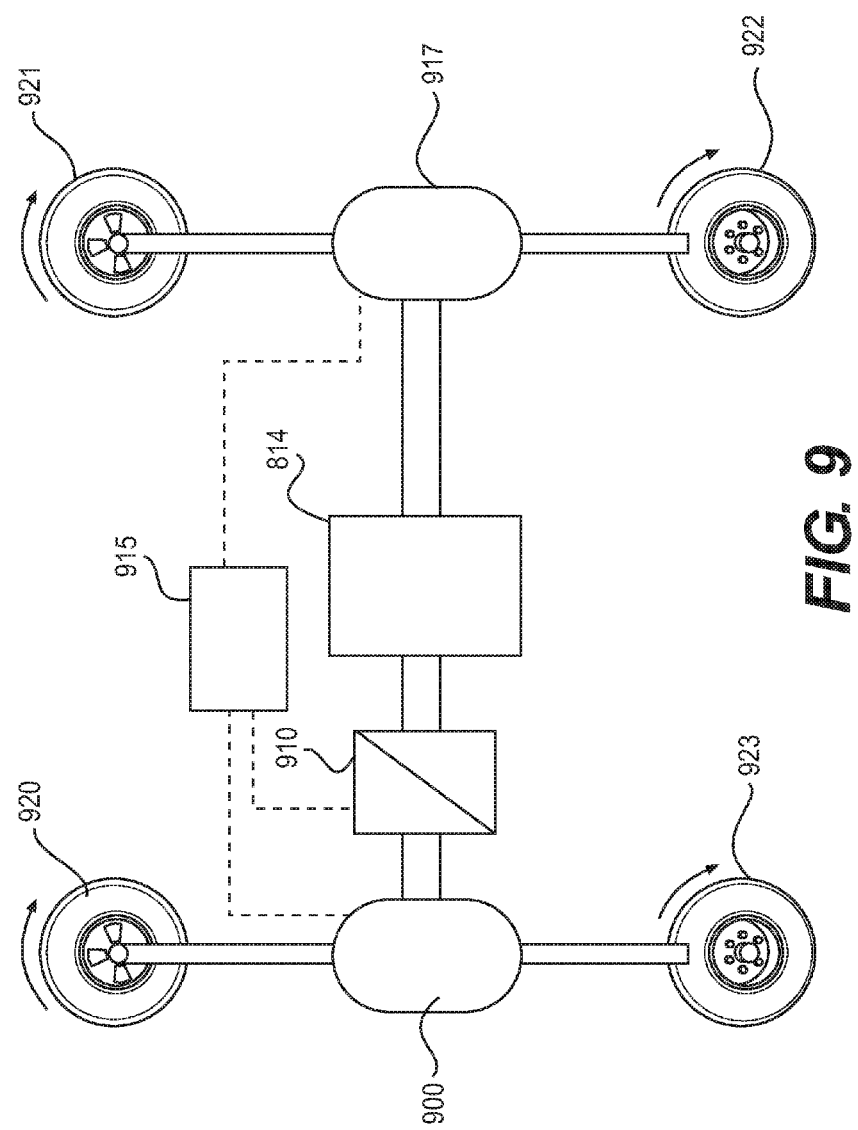
FIG. 9 shows a schematic embodiment of a kinetic energy capture system for use in a vehicle.

FIG. 9 shows a schematic embodiment of a regenerative braking system that may be used as at least a part of a kinetic energy capture system for vehicle 810. In this embodiment, a vehicle may be provided with four wheels: a first wheel 920, a second wheel 921, a third wheel 922, and a fourth wheel 923. Each wheel may be associated with an electric motor 900 via a drive train, axles, a gear box 917, or other known systems. Rechargeable battery 814 is also associated with electric motor 900. Battery 814 may be connected to motor 900 directly or battery 814 may be indirectly connected to motor 900 via a controller 915 and/or an inverter 910. Controller 915 may be any type of processer known in the art, such as an onboard computer system. Controller 915 may be provided with memory, such as RAM, ROM, flash memory, or any other type of memory known in the art. The memory may contain software configured to control the discharge of energy from battery 814 and the recharging of battery 814 via the regenerative braking process.

Regenerative braking is well known. Instead of slowing the wheels of a vehicle down by clamping the wheels and dissipating the energy from that clamping process as heat, the wheels are turned in the opposite direction to the drive direction. By turning the wheels in this opposite direction, motor 900 transitions from an energy consuming device to an energy creating device. Effectively, motor 900 becomes a generator that captures the kinetic energy of the turning of the wheels and converts that energy into electricity. Typically, motor 900 produces and uses alternating current. Inverter 910 then further converts that generated electricity into direct current, a form of energy that can be stored in battery 814. In this manner, a regenerative braking system may be used to charge battery 814. In some embodiments, inverter 910 may be unnecessary if motor 900 uses direct current.

The iterative process of surplus power generation described above is not limited to mining, but may be used in any endeavor where a transport may be loaded for a downhill trip and unloaded for an uphill trip at a sufficient weight differential between the loaded and unloaded vehicle to provide surplus energy generation on a trip cycle. Industries that may benefit from an iterative kinetic energy capture system that exploits potential energy in operations include but are not limited to power generation, construction, manufacturing, and shuttling operations such as funicular or tramp operations where the cars may be heavily loaded in the downward direction only during selected times, such as the end of a work day. In any of these operations, the surplus power may be discharged into a power grid or into reserved batteries for use in the system.

For example, the system above may be adapted for use in hydroelectric power generation. Vehicle 810, discussed above, includes ground contacting elements, in this case, wheels, that are configured to directly contact the ground. In other embodiments, vehicle 810 may be configured to operate on rails. In such rail embodiments, vehicle 810 may be capable of operating at steeper grades than wheeled vehicles. For example, in some hydroelectric power generating operations, reservoirs situated at a relatively high elevation are used to generate electrical power by drawing the water down into a chamber to run turbines or other exergy extraction machines, and is then pumped back up into the reservoir. Bores are excavated between the chamber and the reservoir. Some bores may be at a 30% grade, while other bores may be at higher or lower grades. A light railed vehicle may be used to excavate the bore. The vehicle may be unloaded in the chamber and then driven up the bore on a rack and pinion system to provide stability for the steep grade. The railed vehicle may be loaded with waste rock and/or earth, then sent back down the bore with the heavy load. Following the principles discussed above, the light railed vehicle may be configured with a battery and kinetic energy capture system that charges the battery. As iterative trips are made up and down the bore, the weight differential between the empty and the loaded light railed vehicle can charge the battery to a maximum desired capacity. The chamber may be provided with a discharging system as discussed above, so that additional batteries and/or the chamber power grid may be charged using the surplus energy generated during the excavation process.

While various embodiments of the invention have been described, the description is intended to be exemplary, rather than limiting and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A system for employing gravity to provide electrical power for mining operations in a mine, wherein the mine has a shaft extending downward from the earth's surface to a chamber containing a power grid for powering the mining operations, and a deposit having an ore face positioned between the chamber and the earth's surface, such that the chamber is disposed downwardly from the ore face, the system comprising:
- a ramp extending between the ore face and the chamber;
- a zero-emissions vehicle including a kinetic energy capture system;
- a first battery on the zero-emissions vehicle, wherein the first battery is configured to power the zero-emissions vehicle and to be charged by the kinetic energy capture system when the zero-emissions vehicle travels down the ramp from the ore face to the chamber while the zero-emissions vehicle carries a load;
- a discharging device disposed in the chamber, wherein the discharging device is configured to discharge energy out of the first battery and into the power grid only when the first battery is attached to the discharging device in the chamber.

2. The system of claim 1, wherein the first battery is configured to receive a net surplus energy charge from the kinetic energy capture system when the zero-emissions vehicle makes a trip cycle, wherein a trip cycle is a loaded trip down the ramp to the chamber and an unloaded trip up the ramp back to the deposit.

3. The system of claim 2, wherein the first battery is attached to the discharging device after at least one trip cycle.

4. The system of claim 2, wherein the first battery is attached to the discharging device after more than two trip cycles.

5. The system of claim 1, wherein the discharging device is a bidirectional charger.

6. The system of claim 1 further comprising at least one additional minimally charged battery so that the first battery on the vehicle may be replaced with the minimally charged battery when the first battery is attached to the discharging device.

7. The system of claim 1, wherein the kinetic energy capture system is a regenerative braking system.

8. A system for employing gravity to provide electrical power for mining operations in a mine, wherein the mine has a shaft extending downward from the earth's surface to a chamber and a deposit having an ore face positioned between the chamber and the earth's surface, such that the chamber is disposed downwardly from the ore face, the system comprising:
- a ramp extending between the ore face and the chamber;
- a power grid for powering the mining operations, wherein the power grid is disposed within the chamber;
- a zero-emissions vehicle including a kinetic energy capture system;
- a battery on the zero-emissions vehicle and configured to power the zero-emissions vehicle when attached to the zero-emissions vehicle and to receive power from the kinetic energy capture system when the zero-emissions vehicle travels down the ramp carrying a load from the ore face to the chamber; and
- a discharging device configured to discharge energy out of the battery and into the power grid only when the first battery is attached to the discharging device in the chamber.

9. The system of claim 8 further comprising a charging cycle,
- wherein the charging cycle comprises the zero-emissions vehicle conveying a load of ore down the ramp from the ore face to the chamber and the zero-emissions vehicle driving up the ramp from the chamber to the ore face while the zero-emissions vehicle is unloaded,
- wherein the loaded zero-emissions vehicle is heavier when the zero-emissions vehicle is conveying a load than when the unloaded zero-emissions vehicle is unloaded, and
- wherein the battery is configured to receive a net surplus energy charge from the charging cycle.

10. The system of claim 9, wherein the net surplus energy charge from a charging cycle is sufficient to charge the battery to a maximum desired charge.

11. The system of claim 9, wherein the net surplus energy charge from more than one charging cycle is sufficient to charge the battery to a maximum desired charge.

12. The system of claim 11, wherein the maximum desired charge is a 100 percent charge.

13. The system of claim 9, wherein the battery is attached to the discharging device after at least one charging cycle.

14. The system of claim 9, wherein the battery is attached to the discharging device after more than two charging cycles.

15. The system of claim 8, wherein the battery is configured to be discharged to a minimum acceptable charge by the discharging device.

16. The system of claim 15, wherein the minimum acceptable charge is a 20 percent charge.

17. A system for employing gravity to provide electrical power for mining operations in a mine, wherein the mine has a shaft extending downward from the earth's surface and a deposit having an ore face positioned below the earth's surface, the system comprising:
- a chamber positioned at a bottom of the shaft, wherein the chamber is positioned further below the earth's surface than the ore face is positioned;
- a ramp extending between the ore face and the chamber;
- a power grid for powering the mining operations, wherein the power grid is disposed within the chamber;
- a zero-emissions vehicle including a kinetic energy capture system;
- a first battery on the zero-emissions vehicle and configured to power the zero-emissions vehicle when attached to the zero-emissions vehicle and to receive power from the kinetic energy capture system when the zero-emissions vehicle travels down the ramp carrying a load from the ore face to the chamber; and
- a discharging device configured to discharge energy out of the first battery and into the power grid only when the first battery is attached to the discharging device in the chamber.

18. The system of claim 17 further comprising a charging cycle,
- wherein the charging cycle comprises the zero-emissions vehicle conveying a load of ore down the ramp from the ore face to the chamber and the zero-emissions vehicle driving up the ramp from the chamber to the ore face while the zero-emissions vehicle is unloaded,
- wherein the zero-emissions vehicle is heavier when the zero-emissions vehicle is conveying a load than when the zero-emissions vehicle is unloaded, and
- wherein the battery is configured to receive a net surplus energy charge from the charging cycle.

19. The system of claim 18, wherein the net surplus energy charge from a charging cycle is sufficient to charge the first battery to a maximum desired charge.

20. The system of claim 18, wherein the net surplus energy charge from more than one charging cycle is sufficient to charge the first battery to a maximum desired charge.

21. The system of claim 20, wherein the maximum desired charge is a 100 percent charge.

22. The system of claim 18, wherein the first battery is attached to the discharging device after at least one charging cycle.

23. The system of claim 18, wherein the first battery is attached to the discharging device after more than two charging cycles.

24. The system of claim 17, wherein the first battery is configured to be discharged to a minimum acceptable charge by the discharging device.

25. The system of claim 17 further comprising at least one additional minimally charged battery so that the first battery on the vehicle may be replaced with the minimally charged battery when the first battery is attached to the discharging device.

* * * * *